US006848987B2

(12) United States Patent
    Draft

(10) Patent No.: US 6,848,987 B2
(45) Date of Patent: Feb. 1, 2005

(54) APPARATUS AND METHOD OF TRANSPORTING AND STUNNING LIVESTOCK

(76) Inventor: Roger Draft, 5500 E. 68th, Newaygo, MI (US) 49337

( * ) Notice: Subject to any disclaimer, the term of this patent is extended or adjusted under 35 U.S.C. 154(b) by 0 days.

(21) Appl. No.: 10/302,148

(22) Filed: Nov. 22, 2002

(65) Prior Publication Data

US 2004/0102147 A1 May 27, 2004

(51) Int. Cl.⁷ .................................................. A22B 3/00
(52) U.S. Cl. ......................................................... 452/66
(58) Field of Search .............................. 452/66, 52, 53, 452/57

(56) References Cited

U.S. PATENT DOCUMENTS

| | | |
|---|---|---|
| 1,248,220 A | 11/1917 | Wayne |
| 1,458,736 A | 6/1923 | Stewart |
| 1,522,870 A | 1/1925 | Dean |
| 1,580,774 A | 4/1926 | Barker |
| 1,580,775 A | 4/1926 | Barker |
| 1,804,671 A | 5/1931 | Carr |
| 2,737,683 A | 3/1956 | Regensburger |
| 2,978,737 A | 4/1961 | Hughes |
| 3,230,577 A | 1/1966 | Hughes |
| 3,279,432 A | 10/1966 | Forstmaier et al. |
| 3,548,447 A | 12/1970 | Price, Jr. |
| 4,084,714 A | 4/1978 | Williams |
| 4,092,761 A | 6/1978 | McWhirter |
| 4,107,818 A | 8/1978 | Scott et al. |
| 4,419,962 A | 12/1983 | Siciliano |
| 4,831,966 A | 5/1989 | Tutelian |
| 5,112,270 A | 5/1992 | Howard et al. |
| 5,152,714 A | 10/1992 | Audsley et al. |
| 5,186,677 A | 2/1993 | Christensen et al. |
| 5,221,554 A * | 6/1993 | Gamay ........................ 426/646 |
| 5,435,776 A | 7/1995 | Owen et al. |
| 5,643,072 A | 7/1997 | Lankhaar et al. |
| 5,653,629 A * | 8/1997 | Audsley et al. ............... 452/66 |
| 5,902,089 A | 5/1999 | Sinn et al. |
| 5,975,029 A | 11/1999 | Morimoto et al. |
| 6,290,592 B1 * | 9/2001 | Allen et al. ................... 452/58 |
| 6,364,759 B2 * | 4/2002 | Allen et al. ................. 452/141 |

OTHER PUBLICATIONS

Effect Of Carbon Dioxide Immobilization On The Bleeding Of Chickens; Kotula, Drewniak and Davis; Poultry Science (1957) 36:585–589.

The Association Of Struggle During Exsanguination To Glycolysis, Protien Solubility And Shear In Turkey Pectoralis Muscle; Ma and Addis; vol. 38 (1973) Journal of Food Science; pp. 995–997.

Preferential Feeding Behaviour Of Hens In Different Gaseous Atmospheres; Mohan Raj and Gregory; British Poultry Science (1991) 32:57–65.

Gas Stunning Poultry; Mohan Raj; Department of Meat Animal Science, University of Bristol, Langford, BS18 7DY. U.K.; 1992.

Carbon Dioxide Hog Slaughtering Improves Yields; The MEATing Place magazines (On–line community); Meat Marketing & Technology; Aug. 1994.

(List continued on next page.)

*Primary Examiner*—Thomas Price
(74) *Attorney, Agent, or Firm*—Price, Heneveld, Cooper, DeWitt & Litton, LLP (57) ABSTRACT

A method for the preparation of slaughter of poultry is provided that includes conveying the poultry in cages to at least one gassing chamber to sedate and render the poultry unconscious without killing them.

18 Claims, 6 Drawing Sheets

OTHER PUBLICATIONS

An Evaluation Of Humane Gas Stunning Methods For Turkeys; Raj and Gregory; The Veterinary Record, Sep. 3, 1994; pp. 222–223.

An Investigation Into The Batch Killing Of Turkeys In Their Transport Containers Using Mixtures Of Gases; Raj; Research in Veterinary Science 1994, 56, 325–331.

A Comparison Of Argon, Carbon Dioxide, and Nitrogen In A Broiler Killing System; Poole and Fletcher; Department of Poultry Science, University of Georgia; 1995.

Effects Of Post–Mortem Time Before Chilling And Chilling Temperatures On Water–Holding Capacity And Texture Of Turkey Breast Muscle; M. T. Lesiak, Olson, C. A. Lesiak, and Ahn; 1997 Poultry Science 76: 552–553.

Rigor Mortis Development At Elevated Temperatures Induces Pale Exudative Turkey Meat Characteristics; McKee and Sams; 1998 Poultry Science 77:169 (1st page of article only).

Comparison Of A Modified Atmosphere Stunning–Killing System To Conventional Electrical Stunning And Killing On Selected Broiler Breast Muscle Rigor Development And Meat Quality Attributes; Poole and Fletcher; 1998 Poultry Science 77:342–347.

Elevated Plasma Corticosterone Concentrations Influence The Onset Of Rigor Mortis And Meat Color In Broilers; Kannan, Heath, Wabeck, Owens and Mench; 1998 Poultry Science 77:322–328.

$CO_2$–Stunning—Quality And Welfare Comparisons; Gade; Danish Meat Research Institute, Ref. No. 53.310, Manuscript No. 1429E; presented Mar. 24, 1999.

Transportation And Pre–Stun Handling: $CO_2$–Systems; Gade and Christensen; Danish Meat Research Institute, Ref. No. 53.310, Manuscript No. 1430E; presented Mar. 24, 1999.

A Comparison Of Texture And Quality Of Breast Fillets From Broilers Stunned By Electricity And Carbon Dioxide On A Shackle Line Or Killed With carbon Dioxide; Kang and Sams; 1999 Poultry Science 78:1334–1337.

Symposium: Recent Advances In Poultry Slaughter Technology, Slaughter Technology; Fletcher; 1999 Poultry Science 78:277–281.

Controlled Atmosphere Stunning Of Poultry; Hoen and Lankhaar; 1999 Poultry Science 78:287–289.

Bleedout Efficiency, Carcass Damage, And Rigor Mortis Development Following Electrical Stunning Or Carbon Dioxide Stunning On A Shackle Line; Kang and Sams; 1999 Poultry Science 78:139–143.

Commercial Implementation Of Postmotem Electrical Stimulation; Sams; 1999 Poultry Science 78:290 (1st page of article only).

European Perspective On Poultry Slaughter Technology; Uijttenboogaart; 1999 Poultry Science 78:295–297.

The United States Perspectives Towards Poultry Slaughter; Thaler; 1999 Poultry Science 78:298–301.

Recent Advances In Electrical Stunning; Bilgili; 1999 Poultry Science 78:282–286.

Meat Quality During Processing; Sams; 1999 Poultry Science 78:798–803.

Stunning Of Poultry; Barbut; CRC Press 2002 Chapter 5 pp. 109–127.

Brochure for Anglia Autoflow Ltd., Easyload modular live bird handling system.

Brochure for Bright Coop Viking Trailers.

* cited by examiner

APPARATUS AND METHOD OF TRANSPORTING AND STUNNING LIVESTOCK

BACKGROUND OF THE INVENTION

The present invention relates to the preparation of livestock for slaughter, and more particularly to the preparation of poultry for slaughter.

The slaughter of poultry is necessary to obtain poultry meat for consumption by humans. The process begins with transportation of the poultry to the slaughterhouse. This typically involves removal of the birds from a transport cage upon arrival at the slaughterhouse. The removal of the birds from the cages involves a struggle by the birds and is a difficult and dirty task. The process also often involves shackling of the poultry. However, poultry in their normal state severely resist such restriction, thereby making it difficult for a worker to shackle the birds and making the environment undesirable due to dust and feather debris being scattered throughout the air. Furthermore, during the struggle, the meaty tissue of the poultry can become bruised or bones may be broken, making it less than ideal to providing to the consuming public.

Various approaches have been taken to remedy the problem of poultry resisting restriction. One such approach uses electricity to stun the bird after it has been shackled. Different levels of current and different frequencies have been used in an attempt to reduce bruising and bone breakage, but these procedures have been largely unsuccessful. This approach is undesirable for at least two reasons. First, electric shock can cause bruising and clotting, leaving blood spots in the meaty tissue. Second, the electric shock causes trauma to the poultry which is unpleasant to the bird and should be avoided if possible.

Another approach uses gases to stun and kill the poultry before being shackled. The killing of poultry by using a gaseous environment of carbon dioxide, nitrogen, and/or argon is not desirous because it results in tough meat. Plus, exposure to a high concentration of gas can be very traumatic to the poultry as many gasses act as a suffocant (as opposed to an anesthetic).

Furthermore, most systems for transportation of poultry involve manual labor for loading and unloading the birds into cages or other compartments. Many of these cages or compartments only hold two or a few birds, which causes added tension to in birds making them even harder to handle as they are calmer in larger groups. Therefore, there is a need for a process and apparatus for preparing poultry for slaughter that is less labor intensive, causes little trauma to the birds, and results in a good meat product.

SUMMARY OF THE INVENTION

One aspect of the present invention is a method of preparing poultry for slaughter comprising the steps of providing a plurality of gated cages, each cage containing several poultry; advancing the cages of live poultry to a chamber; sedating the several live poultry in each cage in the chamber by subjecting them to an atmosphere of about 20% to about 40% $CO_2$ for a time sufficient to calm the live poultry to a tranquil state; gradually rendering the sedated live poultry to a state of live deep unconsciousness by subjecting them to an atmosphere of about 55% to about 75% $CO_2$ for a time sufficient to render the sedated live poultry to a deep unconscious state but still alive; advancing each cage of deeply unconscious but alive poultry to a work station; and discharging the unconscious live poultry from the gated cages at the work station for hanging prior to bleeding and slaughter.

Another aspect of the present invention is a method for preparing poultry for slaughter comprising the steps of providing a plurality of gated cages, each cage containing several live poultry; advancing the cages of live poultry in succession to a first chamber; gradually sedating the several live poultry in each cage in the first chamber by subjecting them to an atmosphere of about 25% to about 35% $CO_2$ for a time sufficient to calm the live poultry to an anaesthetized state; advancing each cage of sedated live poultry to a second chamber; rendering the sedated live poultry to a state of live deep unconsciousness by subjecting them to an atmosphere of about 60% to about 70% $CO_2$ for a time sufficient to render the sedated live poultry to a deep unconscious state but still alive; advancing each cage of deeply unconscious but alive poultry to a work station; and successively discharging the unconscious live poultry from the gated cages at the work station for slaughter.

Yet another aspect of the present invention is a method for preparing poultry for slaughter comprising the steps of providing a plurality of gated cages, each cage containing several live poultry positioned on a tractor trailer; lifting the cages off the tractor trailer and placing the cages on a conveying system; conveying the cages of live poultry in succession to a first chamber; sedating the several live poultry in each cage in the first chamber by subjecting them to an atmosphere of about 20% to about 40% $CO_2$ for a time sufficient to calm the live poultry to a anaesthetized state; rendering the sedated live poultry to a state of live deep unconsciousness by subjecting them to an atmosphere of about 55% to about 75% $CO_2$ for a time sufficient to render the sedated live poultry deeply unconscious but still alive; and discharging the deeply unconscious live poultry from the gated cages.

These and other features, advantages and objects of the present invention will be further understood and appreciated by those skilled in the art by reference to the following specification, claims and appended drawings.

DETAILED DESCRIPTION OF PREFERRED EMBODIMENT

The slaughter of poultry for the production of meat for consumption by humans is a multi-step process that typically starts at a separate poultry farm where the poultry are raised until they are of an age and size prime for slaughter.

Many of the slaughter preparation steps have heretofore involved significant manual labor and a struggle by the birds to escape. The present invention is a very humane method for the preparation of poultry for slaughter. The poultry are generally loaded onto a semi tractor trailer bed in cages. The cages that form a part of the present invention can hold upwards of twenty-five live standard size turkeys, which is important because poultry, including turkeys, are calmer in large groups than they are alone or in smaller groups. Thus, the birds in this process start out in a calm state, and are not removed from the tranquil cage environment until they are rendered deeply unconscious, as described below.

A preferred cage for this use is shown and described in U.S. patent application Ser. No. 10/092,657, entitled CAGE FOR TRANSPORTING AND STUNNING LIVESTOCK, which is hereby incorporated by reference. The preferred cages are preferably 5'x8', and can be stacked at least five high on a tractor trailer bed, thereby allowing forty cages on each tractor trailer bed for transport.

Figure 1:
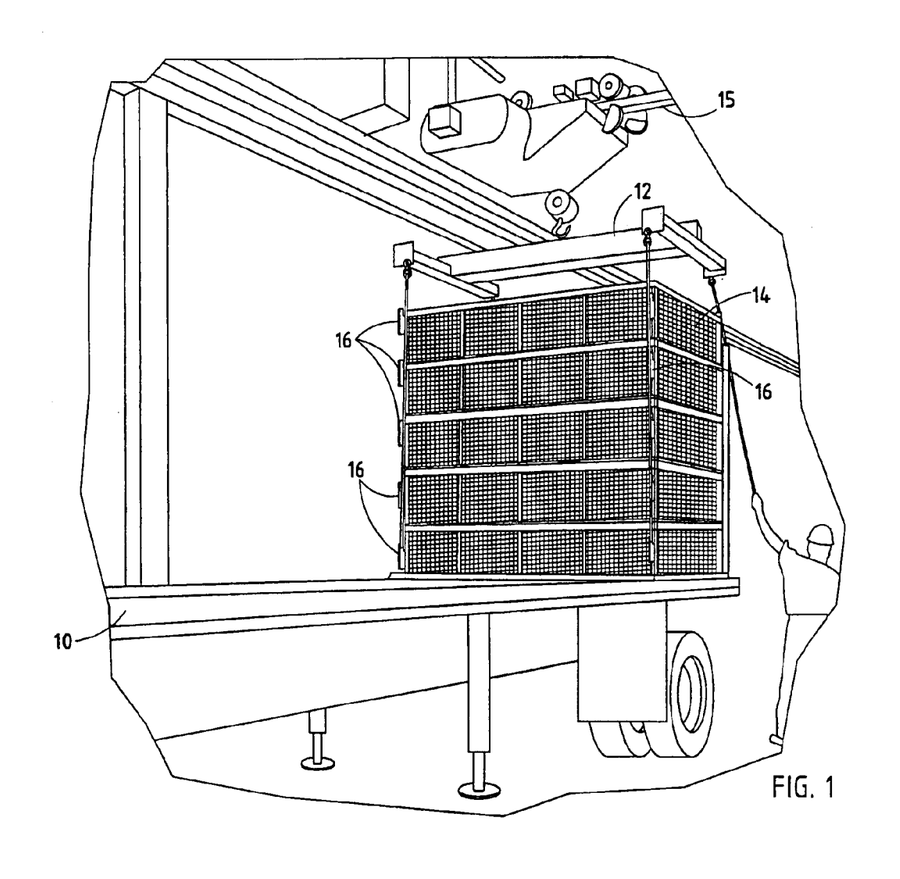
FIG. 1 is a perspective view of a stack of cages filled with poultry on a tractor trailer bed.
Figure 2:
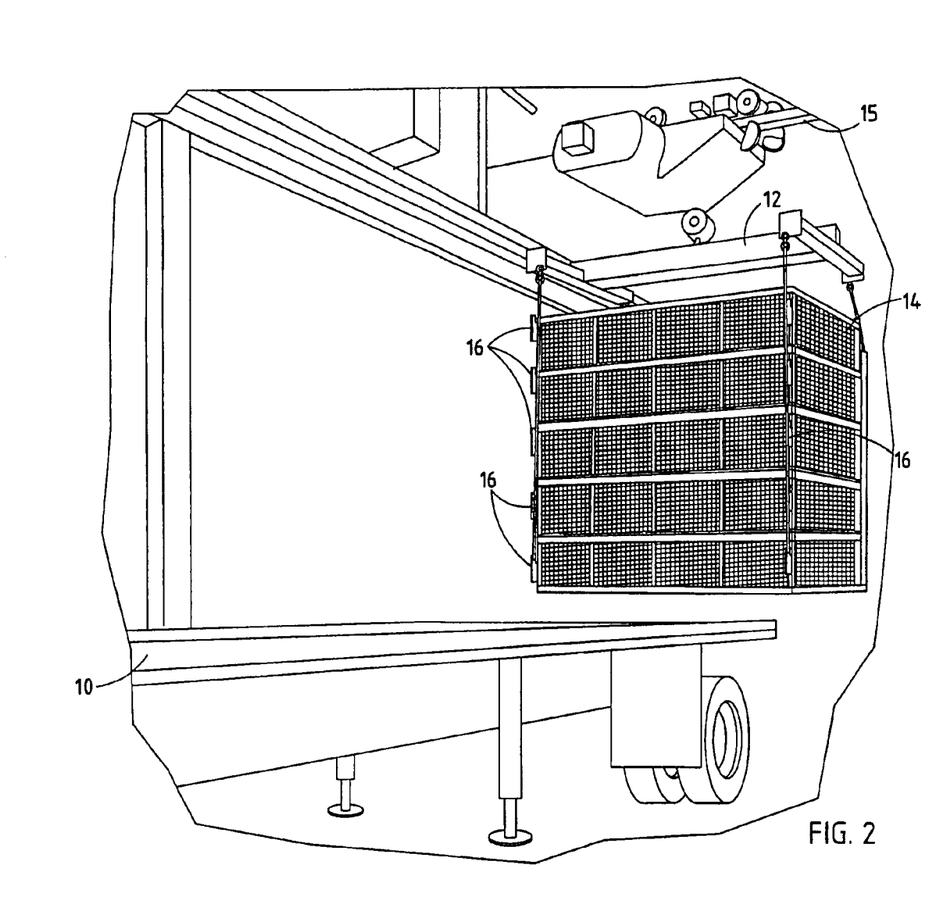
FIG. 2 is a perspective view of a stack of cages of live poultry such as those in FIG. 1, the stack of cages being removed from the tractor trailer bed.

The cages containing live poultry are transported from the farm loading area to the slaughtering facility. In the present invention, the tractor trailer bed 10 is preferably driven into the facility, as shown in FIG. 1, and into an area where a hoist 12 can be moved over the stack of cages 14. Hoist 12 is moved in position over one of the stacks of cages 14, as shown in FIG. 1, and is attached to lifting lugs 16 on the bottom cage. Once securely attached to the cage, the hoist 12 is lifted upward and moved away from the tractor trailer bed 10, as shown in FIG. 2. Stack by stack, the cages 14 are successively moved to a conveying system 18 by hoist 12. The hoist 12 is on a track 15 which allows movement of the hoist laterally from one position to another.

Figure 3A:
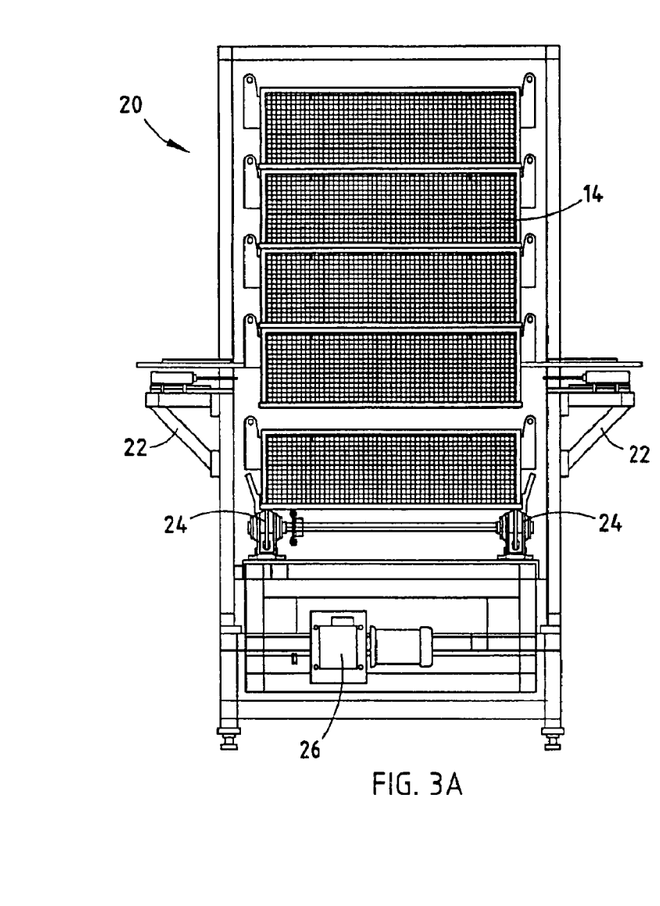
FIG. 3A is a front elevation view of a cage destacker to be used with the present invention.
Figure 3B:
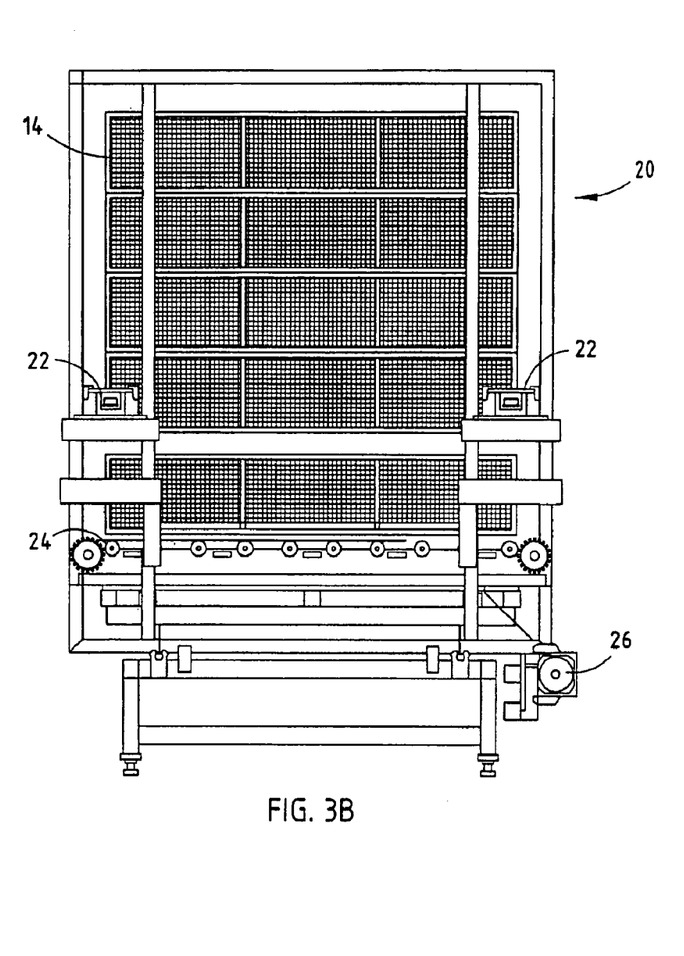
FIG. 3B is a side view of the cage destacker shown in FIG. 3A.

The first part of the conveying system 18 is a destacker 20 (see FIGS. 3A and 3B). The destacker 20 separates the stack of cages 14 into individual cages to be conveyed through the remainder of the slaughter preparation process. Destacker 20 includes two lifters 22 on each side of the stack of cages that attach to the sides of the cage that is one up from the bottom cage. Destacker 20 also includes two belts 24 that are driven by a chain hooked to a motor 26. Lifters 22 lift the entire stack of cages with the exception of the bottom one to provide clearance so that the bottom one can be moved (see FIG. 3A). Motor 26 is then activated causing belts 24 to move, thereby conveying the bottom cage to the next area. This process is repeated for the remainder of the stack until what was originally the top cage is conveyed away from the destacker 20. Then a new stack of cages is advanced into the destacker for the same process, and so on.

Figure 4:
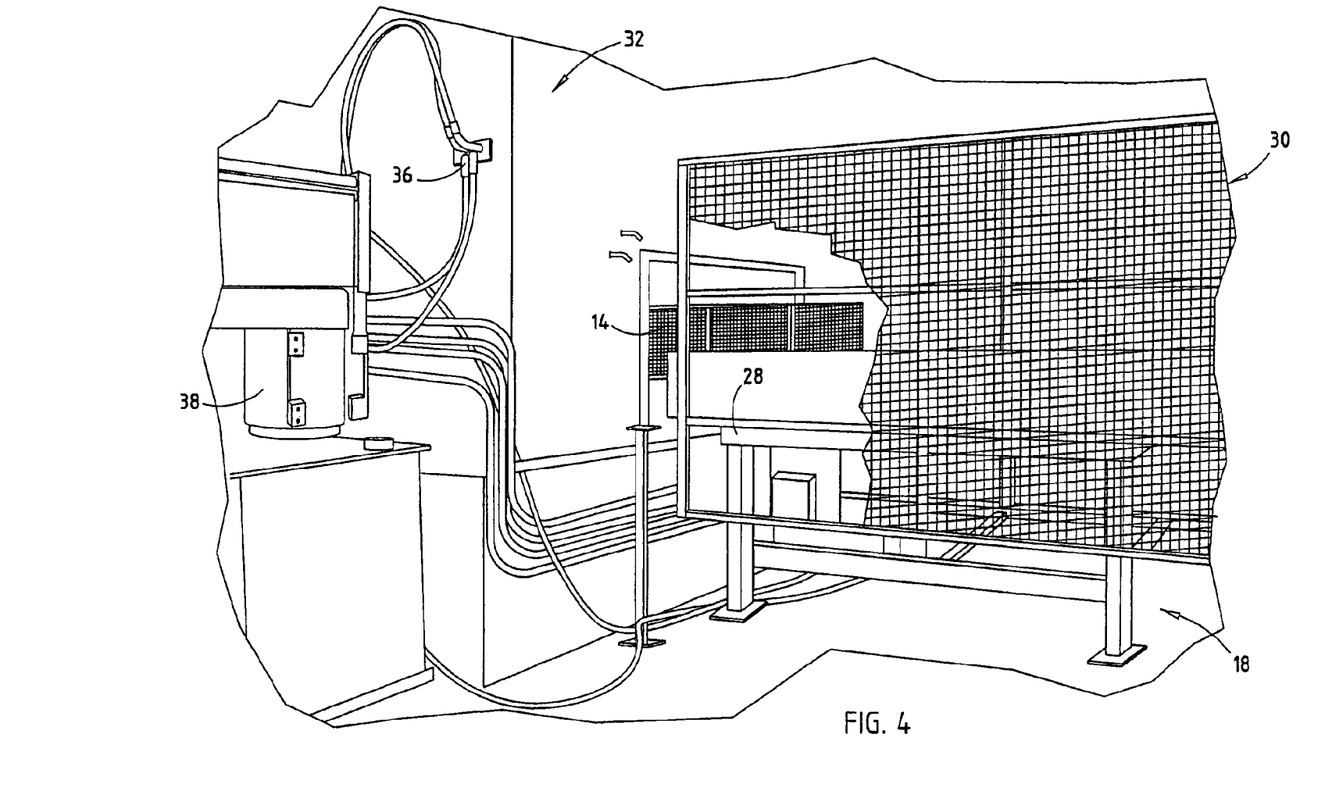
FIG. 4 is a view of the conveying system of the present invention and the outer walls of the stunning room that is part of the present invention.

The conveying system 18, including conveyor 28 (see FIG. 4), moves each cage through a protected area 30 to a stunning room 32. The cages are handled and conveyed slowly and steadily without human presence so as not to excite the poultry in the cages any more than is necessary so that they are in a tranquil state as they go through the preparation process.

Figure 5:
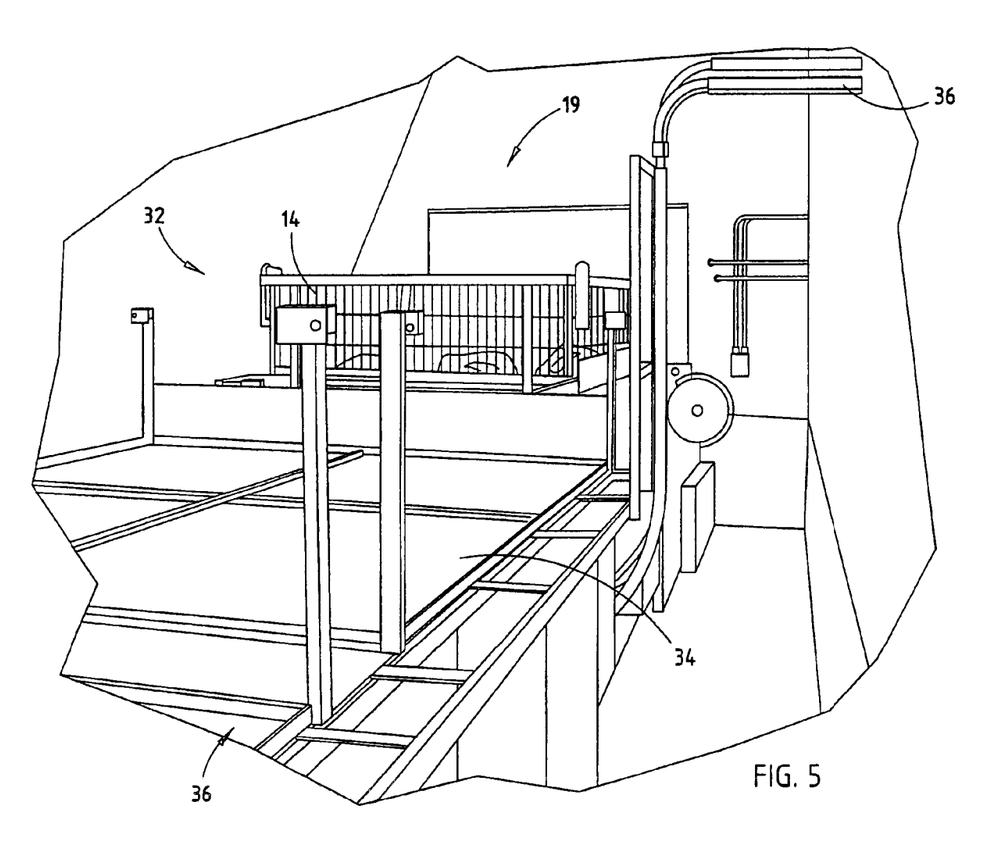
FIG. 5 is a view of the interior of the stunning room and the stunning chamber therein that form part of the present invention.

As shown in FIG. 5, the stunning room 32 includes a two-stage gas chamber 34 which has pipes 36 connected to it so that carbon dioxide can be pumped into it. The carbon dioxide is supplied by a $CO_2$ source 38 outside of the stunning room 32. The first stage of gas chamber 34 preferably has about 20% to about 40% by volume $CO_2$ (with the remainder being air), more preferably about 25% to about 35% $CO_2$, and most preferably about 30% $CO_2$. It is contemplated that the most preferable concentration of $CO_2$ will vary depending on climate conditions, specifically relative humidity, as carbon dioxide and water combine to form carbonic acid which is an irritant to the poultry. Therefore, a balance must be achieved between the right concentration of $CO_2$ and the proper amount of time to stun the poultry, while not being too great of an irritant or causing too much trauma to the poultry.

Cage 14 is conveyed into the stunning room 32 and lowered into gas chamber 34. Cage 14 is left in first stage of gas chamber 34 for an amount of time sufficient to cause the poultry to be in a more anaesthetized state while still being conscious. This is done so the birds will not be significantly irritated by having a large $CO_2$ concentration shock to their system, which is not only an irritant but can cause significant trauma.

Cage 14 is then transferred from the first stage of gas chamber 34 and conveyed to a second stage of gas chamber 34. The second stage of gas chamber 34 is also supplied with $CO_2$ from the $CO_2$ source 38 through pipes 36. The preferred concentration of $CO_2$ in second stage of gas chamber 34 is about 60% to about 70% $CO_2$ (with the remainder being air), and more preferably about 65%. The preferred percentage of $CO_2$ in the second stage also may vary depending on climate conditions, such as relative humidity.

Figure 6:
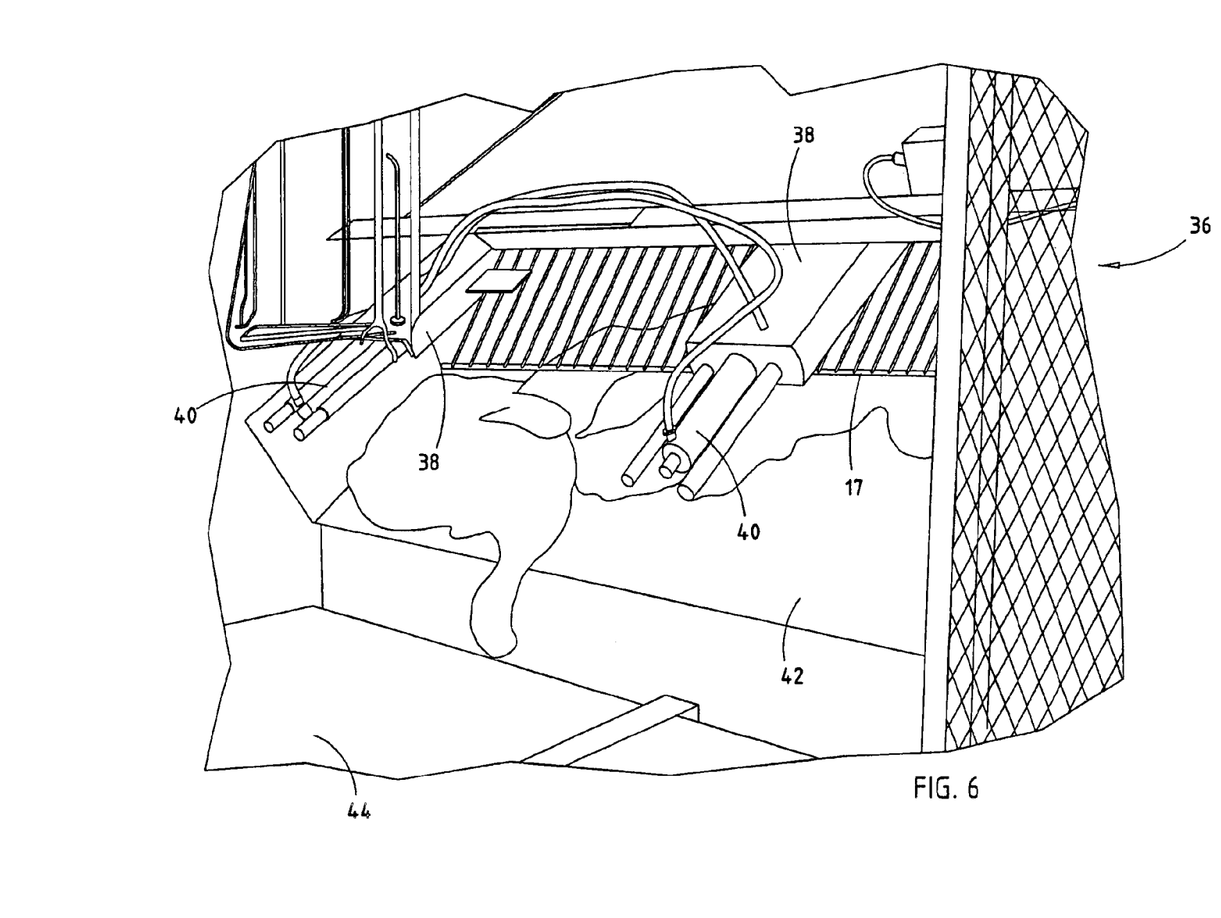
FIG. 6 is a view of an open gate and pneumatic openers.

Cage 14 is preferably in the second stage of gas chamber 34 for a time sufficient to render the poultry deeply unconscious, but still alive. Once the poultry are in a deep state of unconsciousness, cage 14 is raised out of gas chamber 34 and moved to a staging area 36. At the staging area 36, there are preferably two door opening apparatuses 38 which include one or more rods that are moved by pneumatic pressure via a pneumatic cylinder 40 (see FIG. 6). When cage 14 is at the staging area 36, pneumatic pressure is applied to the door opening apparatus 38, the rods are forced outwardly and come in contact with door 17 of the cage. The rods contact the top of the door 17, causing it to be pushed rearwardly, thereby lifting the bottom of the door out of its holding place. Cage 14 is then conveyed to a downwardly angled chute 42. Because door 17 is no longer secured in its holding place, as a result of the cage being tilted, door 17 opens and the poultry exit cage 14, sliding down chute 42 due to gravity. The poultry then fall to a work station 44 where they can be easily handled by workers for the final preparation steps for hanging, bleeding, slaughter and processing.

The above process and related apparatuses and equipment provide a very desirable way to prepare poultry for slaughter. A major advantage of the process of the present invention is that the poultry are unloaded from the tractor trailer without handling by people, keeping the poultry in groups, and resulting in calm birds throughout the entire slaughter preparation process. The process results in poultry that are prepared for slaughter without causing pain or alarm to the birds, and making it much easier for handling the poultry during processing. Furthermore, the process results in meat tissue that is not damaged in the preparation or slaughter, thereby producing higher quality meat with fewer physical defects.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

The invention claimed is:

1. A method of preparing poultry for slaughter comprising:

provide a plurality of gated cages, each cage containing several poultry;

advancing said cages of live poultry in succession to a chamber;

successively sedating the several live poultry in each cage in said chamber by subjecting them to an atmosphere of about 20% to about 40% $CO_2$ for a time sufficient to calm said live poultry to a tranquil state;

successively rendering said sedated live poultry to a state of live unconsciousness by subjecting them to an atmosphere of about 55% to about 75% $CO_2$ for a time sufficient to render said sedated live poultry unconscious but still alive;

successively advancing each cage of unconscious but alive poultry to a work station; and successively discharging said unconscious live poultry from said gated cages at said station for slaughter.

2. The method of claim 1 wherein the step of successively sedating the several live poultry in each cage includes subjecting them to an atmosphere of about 25% to about 35% $CO_2$.

3. The method of claim 2 wherein the step of successively rendering said sedated live poultry to a state of live unconsciousness includes subjecting them to an atmosphere of about 60% to 70% $CO_2$.

4. The method of claim 1 wherein the step of successively sedating the several live poultry in each cage includes subjecting them to an atmosphere of about 30% $CO_2$.

5. The method of claim 1 wherein the step of successively rendering said sedated live poultry to a state of live unconsciousness includes subjecting them to an atmosphere of about 60% to 70% $CO_2$.

6. The method of claim 1 wherein the step of successively rendering said sedated live poultry to a state of live unconsciousness includes subjecting them to an atmosphere of about 65% $CO_2$.

7. The method of claim 1 wherein the step of successively rendering said sedated live poultry to a state of live unconsciousness takes place in a second chamber to which said cages of live poultry are advanced after sedating said live poultry in said first chamber.

8. The method of claim 1 wherein said first chamber is substantially free of added argon.

9. A method of preparing poultry for slaughter comprising:

providing a plurality of gated cages, each cage containing several live poultry;

advancing said cages of live poultry in succession to a first chamber;

successively sedating the several live poultry in each cage in said first chamber by subjecting them to an atmosphere of about 25% to about 35% $CO_2$ for a time sufficient to calm said live poultry to a tranquil state;

successively advancing each cage of sedated live poultry to a second chamber;

successively rendering said sedated live poultry to a state of live unconsciousness by subjecting them to an atmosphere of about 60% to about 70% $CO_2$ for a time sufficient to render said sedated live poultry unconscious but still alive;

successively advancing each cage of unconscious but alive poultry to a work station; and successively discharging said unconscious live poultry from said gated cages at said work station for slaughter.

10. The method of claim 9 wherein the step of successively sedating the several live poultry in each cage includes subjecting them to an atmosphere of about 30% $CO_2$.

11. The method of claim 9 wherein the step of successively rendering said sedated live poultry to a state of live unconsciousness includes subjecting them to an atmosphere of about 65% $CO_2$.

12. The method of claim 10 wherein the step of successively rendering said sedated live poultry to a state of live unconsciousness includes subjecting them to an atmosphere of about 65% $CO_2$.

13. A method of preparing poultry for slaughter comprising:

providing a plurality of gated cages, each cage containing several live poultry and positioned on a tractor trailer;

successively lifting each cage off said tractor trailer and placing said cage on a conveying system;

conveying said cages of live poultry in succession to a first chamber;

successively sedating the several live poultry in each cage in said first chamber by subjecting them to an atmosphere of about 20% to about 40% $CO_2$ for a time sufficient to calm said live poultry to a tranquil state;

successively rendering said sedated live poultry to a state of live unconsciousness by subjecting them to an atmosphere of about 55% to about 75% $CO_2$ for a time sufficient to render said sedated live poultry unconscious but still alive; and successively discharging said unconscious live poultry from said gated cages for slaughter.

14. The method of claim 13 wherein the step of successively sedating the several live poultry in each cage includes subjecting them to an atmosphere of about 25% to about 35% $CO_2$.

15. The method of claim 13 wherein the step of successively sedating the several live poultry in each cage includes subjecting them to an atmosphere of about 30% $CO_2$.

16. The method of claim 13 wherein the step of successively rendering said sedated live poultry to a state of live unconsciousness includes subjecting them to an atmosphere of about 60% to 70% $CO_2$.

17. The method of claim 13 wherein each cage is adapted to contain at least 10 regular sized turkeys.

18. The method of claim 13 wherein said gated cages are stackable upon another and wherein said gated cages are provided in a stacked fashion on said tractor trailer.

* * * * *

UNITED STATES PATENT AND TRADEMARK OFFICE
CERTIFICATE OF CORRECTION

PATENT NO. : 6,848,987 B2
DATED : February 1, 2005
INVENTOR(S) : Roger Draft

It is certified that error appears in the above-identified patent and that said Letters Patent is hereby corrected as shown below:

<u>Column 1,</u>
Line 25, "providing" should be -- provide --;
Line 48, after "tension" delete "to"

Signed and Sealed this

Tenth Day of May, 2005

JON W. DUDAS
*Director of the United States Patent and Trademark Office*